United States Patent
Schlumm et al.

(10) Patent No.: US 12,023,611 B2
(45) Date of Patent: Jul. 2, 2024

(54) LIQUID CARRIER FILTRATION

(71) Applicant: Hewlett-Packard Development Company, L.P., Spring, TX (US)

(72) Inventors: Doron Schlumm, Ness Ziona (IL); Igor Chertov, Ness Ziona (IL); Sergei Trifonov, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/254,898

(22) PCT Filed: Nov. 29, 2018

(86) PCT No.: PCT/US2018/063112
§ 371 (c)(1),
(2) Date: Dec. 22, 2020

(87) PCT Pub. No.: WO2020/112119
PCT Pub. Date: Jun. 4, 2020

(65) Prior Publication Data
US 2021/0291088 A1   Sep. 23, 2021

(51) Int. Cl.
*B01D 35/06* (2006.01)
*G03G 15/10* (2006.01)

(52) U.S. Cl.
CPC ........... *B01D 35/06* (2013.01); *G03G 15/104* (2013.01)

(58) Field of Classification Search
CPC .......................................... G03G 15/104–105
(Continued)

(56) References Cited

U.S. PATENT DOCUMENTS 2,440,504 A    4/1948  Harmon et al.
3,909,383 A    9/1975  Sato
(Continued)

FOREIGN PATENT DOCUMENTS

CN    1151134 A    6/1997
EP    2541336      1/2013
(Continued)

OTHER PUBLICATIONS

Definition of "reservoir"—Merriam-Webster, https://www.merriam-webster.com/dictionary/reservoir (Year: 2022).*

*Primary Examiner* — Leon W Rhodes, Jr.
(74) *Attorney, Agent, or Firm* — Jordan IP Law, LLC

(57) ABSTRACT

An filtration apparatus is disclosed. The filtration apparatus is to remove non-liquid contaminant from liquid carrier. The filtration apparatus may include an electrode having a first surface, wherein the electrode is to generate an electric field towards liquid carrier containing non-liquid contaminant. The filtration apparatus may include a reservoir having a wall defined at least partially by the first surface, the reservoir to house a volume of liquid carrier. The filtration apparatus may include a plurality of plates, each plate having an accumulation surface, wherein a portion of each plate is within the reservoir, so as to be submerged in the volume of liquid carrier. An electric field formed between the first surface and the accumulation surface of each plate of the plurality of plates may act on the liquid carrier, to thereby cause non-liquid contaminant to adhere to an accumulation surface of a plate of the plurality of plates. A method and a print apparatus are also disclosed.

11 Claims, 6 Drawing Sheets

(58) Field of Classification Search
USPC .......................................................... 399/57
See application file for complete search history.

(56) References Cited

U.S. PATENT DOCUMENTS

| | | |
|---|---|---|
| 4,799,452 A | 1/1989 | Day |
| 5,143,630 A | 9/1992 | Rolchigo |
| 5,942,095 A * | 8/1999 | Day .................... G03G 15/104 |
| | | 204/553 |
| 6,019,455 A | 2/2000 | Taylor et al. |
| 7,686,933 B2 * | 3/2010 | Browne .................... B03C 5/00 |
| | | 204/513 |
| 9,016,198 B2 * | 4/2015 | Lam .................... G03G 21/0088 |
| | | 204/600 |
| 2010/0225919 A1 | 9/2010 | Birecki et al. |
| 2012/0079955 A1 | 4/2012 | Lam et al. |

FOREIGN PATENT DOCUMENTS

| | | | |
|---|---|---|---|
| JP | 06145671 A * | 5/1994 | |
| JP | H1074027 | 3/1998 | |
| JP | 2000354789 A * | 12/2000 | |
| JP | 3217135 B2 * | 10/2001 | |
| JP | 2003066805 | 3/2003 | |
| JP | 2003260315 | 9/2003 | |
| JP | 2003270957 | 9/2003 | |
| JP | 2005077896 | 3/2005 | |
| WO | 2006/068968 A2 | 6/2006 | |
| WO | WO-2008032604 A1 * | 3/2008 | ............... B03C 5/02 |
| WO | WO-2011007820 A1 * | 1/2011 | ............... B01D 57/02 |

* cited by examiner

LIQUID CARRIER FILTRATION

BACKGROUND

In some printing systems, print agent is applied to a printable substrate via a roller, or multiple rollers. The print agent may comprise a combination of a non-liquid material in a liquid carrier, such that a portion of the non-liquid material is transferred to the printable substrate and at least some of the liquid carrier can be removed from the apparatus.

After the liquid carrier has transported the non-liquid material, the liquid carrier may remain contaminated with non-liquid material that has not been transferred onto the printable substrate, and with other material, such as particles (e.g. dust) from the printable substrate.

BRIEF DESCRIPTION OF DRAWINGS

Examples will now be described, by way of non-limiting example, with reference to the accompanying drawings, in which.

DETAILED DESCRIPTION

Figure 1:
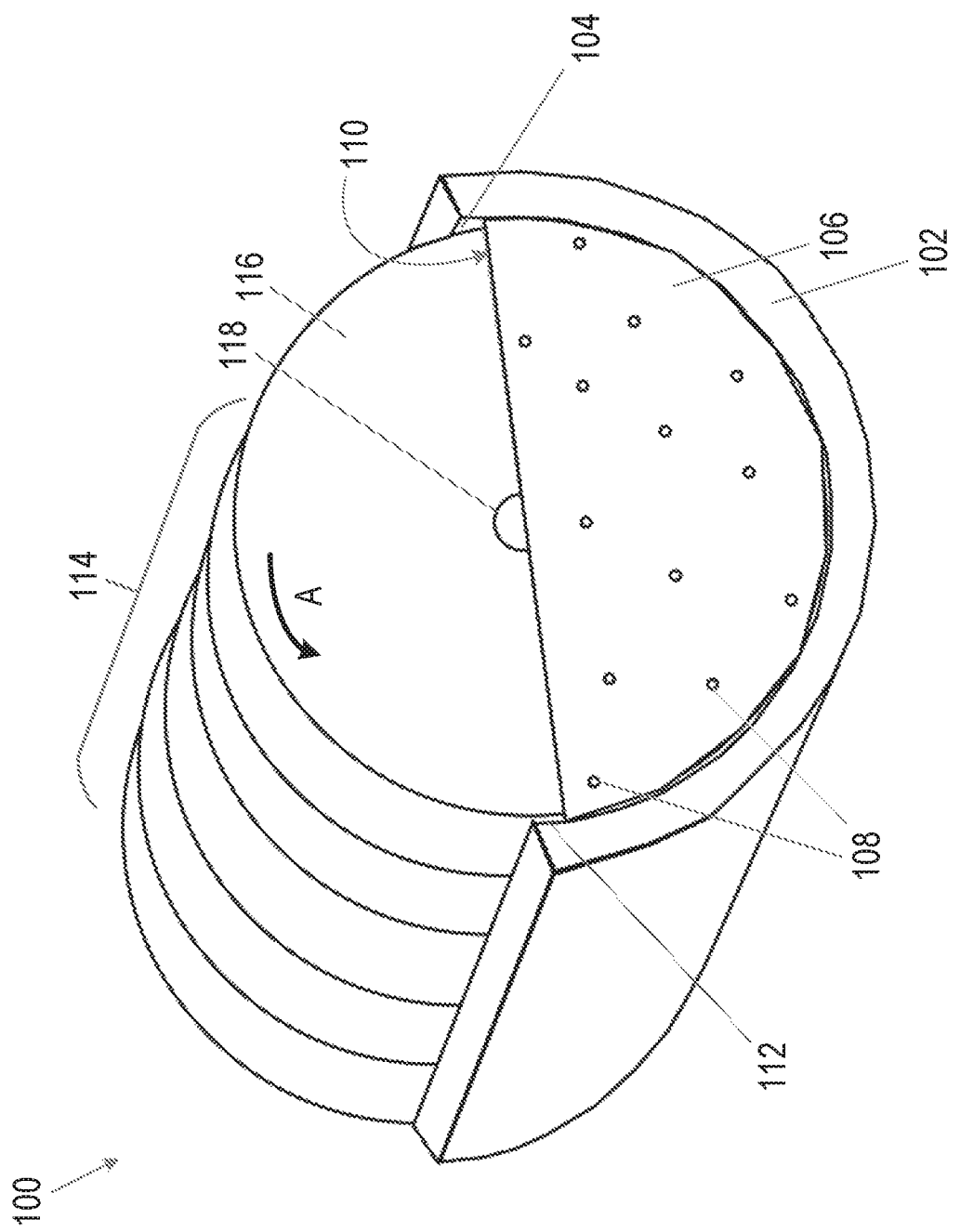
FIG. 1 is a simplified illustration of an example of a perspective view of a filtration apparatus.

The disclosure presented herein relates to a filtration apparatus, such as an apparatus for filtering used print agent. More particularly, the disclosure relates to a filtration apparatus for removing non-liquid contaminant from liquid carrier used in print agent. Aspects of the disclosure may be implemented in printing systems using various different printing technologies. Some examples are described in the context of one particular printing technology, liquid electrophotography.

In a liquid electrophotography (LEP) printing system, print agent, such as ink, may be used which is formed of a combination of non-liquid material (e.g. solid or partially solid material) and a liquid carrier, such as imaging oil. The print agent is stored in a reservoir and may be transferred using a binary ink developer (BID). Each BID transfers print agent of a particular colour, so an LEP printing system may include, for example, seven BIDs. Some of the non-liquid part of the print agent from a BID is selectively transferred from a developer roller of the BID in a layer of substantially uniform thickness to an imaging plate of a photoconductive imaging plate, such as a photo imaging plate (PIP). The selective transfer of print agent may be achieved through the use of electrically-charged (or electrostically-charged) print agent. Thus, the non-liquid component of the print agent may be electrically-charged (or electrostatically-charged) while the liquid carrier carries no electrical or electrostatic charge. The entire imaging plate, which may form part of or be located on a rotatable roller or drum, may be electrostatically charged, using a charging device, such as charge roller (e.g. a ceramic charge roller), which rotates relative to the imaging plate. Areas on the imaging plate representing an image to be printed may then be discharged, for example by forming a latent image on the imaging plate using a laser beam or other type of light. Non-liquid parts of the print agent are transferred to those portions of the imaging plate that have been discharged. The imaging plate may transfer the non-liquid print agent to another roller, such as an intermediate transfer member (ITM), which may be covered by a replaceable print blanket. The non-liquid print agent may subsequently be transferred onto a printable substrate, such as paper, while the liquid part of the print agent (e.g. the liquid carrier) may be removed from the roller(s), and received into a used liquid carrier container, for example.

In other printing systems, the imaging plate may comprise a surface other than a PIP. For example the imaging plate may comprise a sleeve formed or placed around a roller or drum. Such a sleeve may be formed from a material which can be selectively charged and discharged. The term "imaging plate" may be referred to as an imaging surface. The imaging surface may, in some examples, comprise the surface of a photoconductive imaging unit or component.

Even though a large proportion of the non-liquid print agent may be transferred to the printable substrate, the used liquid carrier may still contain non-liquid debris or contaminant, such as non-liquid parts of the print agent that have not been transferred onto a roller and/or onto the printable substrate, particles that have been transferred from components of the printing system into the liquid carrier, particles of dust from the printable substrate (sometimes referred to as paper dust) and other particles or material that contaminate the liquid carrier. According to examples disclosed herein, a mechanism is provided for removing such non-liquid contaminant from used liquid carrier such that, once filtered, the used liquid carrier may be reused or recycled. The filtration apparatus uses an electric field to separate non-liquid contaminants from the liquid carrier, and this filtration mechanism is able to provide improved performance and efficiency over existing print agent filtration methods.

An aspect of the disclosure relates to a filtration apparatus which may, for example, form part of, or be used in conjunction with a print apparatus to filter print agent used in a printing operation.

Referring to the drawings, FIG. 1 is a simplified illustration of an example of a filtration apparatus 100. The filtration apparatus 100 is for removing non-liquid (e.g. solid or partially solid) contaminant from liquid carrier. The liquid carrier may, for example, be liquid carrier, such as imaging oil, used in print agent. The non-liquid contaminant may comprise non-liquid material, such as a solid print agent component or paper dust. The filtration apparatus 100 comprises an electrode 102 having a first surface 104, wherein the electrode is to generate an electric field towards the liquid carrier 106 containing non-liquid contaminant 108. The electrode 102 may, for example, be electrically connected to a power supply (e.g. a high-voltage power supply) (not shown in FIG. 1). In some examples, the electrode 102 may comprise a negative electrode. The filtration apparatus 100 further comprises a reservoir 110 having a wall 112 defined at least partially by the first surface 104, the reservoir to house a volume of liquid carrier 106. Thus, the reservoir 110 may comprise a container into which the liquid carrier 106 may be input. The reservoir 110 may, in some examples, include end walls (not shown in FIG. 1) to contain the liquid carrier 106. In other examples, the electrode 102 may be sealed to other components which form end walls of the reservoir 110.

The filtration apparatus 100 further comprises a plurality of plates 114, each plate having an accumulation surface 116, wherein a portion of each plate is within the reservoir 110, so as to be submerged in the volume of liquid carrier 106. Each plate of the plurality of plates 114 may be relatively thin, such that the surface area of the edge of each plate can be considered negligible. In some examples, the plates may taper towards the edge so as to reduce the surface area of the edges of the plates. By reducing the surface area of the edges of the plates, the sides (i.e. the faces) of each plate serve as the accumulation surfaces 116 rather than the edge (i.e. around the perimeter of the plate). In some examples, each plate 14 may comprise, or be shaped as, a disc. For example, the plates may be substantially circular in shape.

An electric field formed between the first surface 104 and the accumulation surface 116 of each plate of the plurality of plates 114 is to act on the liquid carrier 106, to thereby cause non-liquid contaminant 108 to adhere to an accumulation surface 116 of a plate of the plurality of plates. It will be apparent that non-liquid contaminant 108 in the liquid carrier 106 will adhere to those portions of the plates 114 that are submerged in the liquid carrier. In some examples, the plurality of plates 114 may be electrically grounded. Thus, an electric field is generated from the electrode 102 towards the plates 114, without an electric current or voltage being applied directly to the plates.

In general, the higher the voltage applied to the electrode 102, the greater the development (e.g. attraction) of non-liquid contaminant 108 on the accumulation surfaces 116 of the plurality of plates 114. However, for various reasons (e.g. energy reduction or safety), it may be intended that the voltage is restricted to a particular level. Thus, in some examples, a voltage of up to around 6 kiloVolts (kV) may be applied to the electrode 102. In some examples, a voltage of between around 3.5 kiloVolts (kV) and around 4.5 kV may be applied to the electrode 102. In other examples, a voltage of between around 4 kV and around 4.2 kV may be applied to the electrode 102. In one example, a voltage of around 4.1 kV may be applied to the electrode 102.

As noted above, in some printing systems, electrically-charged or electrostatically-charged print agent may be used and, in such systems, electrically-charged non-liquid print agent contaminant may be present in a liquid carrier. Therefore, the used liquid carrier may contain electrically-charged non-liquid print agent contaminant that has not been transferred onto the printable substrate. The generated electric field will act on the electrically-charged contaminant, causing it to be attracted to the accumulation surface 116 of a plate, or of multiple plates, of the plurality of plates 114. A particle or piece of non-liquid contaminant 108 may be caused to adhere to the accumulation surface 116 to which it is closest. While the electric field exists between the first surface 104 and the plurality of plates 114, the electrically-charged contaminant will be caused to accumulate on and adhere to the accumulation surfaces 116 of the plates. In addition to electrically-charged contaminant and particles, non-electrically-charged contaminant, such as particles from the printable substrate (e.g. paper dust) may become electrostatically-charged as a result of the generated electric field. As such, any material that becomes electrostatically-charged is also attracted to the accumulation surfaces 116 of the plates 114. Since the liquid part (e.g. imaging oil) in the liquid carrier 106 is not electrically-charged, and does not become electrostatically-charged, it is not affected by the generated electric field. As a result, the non-liquid contaminant 108 in the liquid carrier 106 accumulates on the accumulation surfaces 116 of the plates 114 while the liquid carrier remains in the reservoir 110.

As shown in the example of FIG. 1, the plurality of plates 114 are partially submerged in the liquid carrier 106. In some examples, the plurality of plates 114 may rotate about an axis 118 in a direction shown by the arrow A. As the plates rotate, the portion of each plate that is submerged will constantly change, and the non-liquid contaminant 108 that has adhered to the accumulation surface(s) of each plate is moved out of the liquid carrier 106, such that it can be removed from the accumulation surface(s), for example using methods described below. Once the non-liquid contaminant 108 has been removed from the liquid carrier 106, the liquid carrier can be considered to have been filtered (i.e. the non-liquid contaminant has been removed from the liquid carrier). The filtered liquid carrier may then be removed from the reservoir 110, for example to be reused or recycled.

As will be apparent, the larger the accumulation surface 116 (and the larger the diameter of the plates 114), the greater the amount of non-liquid contaminant 108 that can be removed from the liquid carrier 106. However, it may not be feasible to provide an apparatus having particularly large plates 114. In some examples, it may be intended that the filtration apparatus 100 is relatively compact. Thus, in some examples, each plate of the plurality of plates 114 may have a diameter of between around 80 millimetres and around 200 millimetres. In other examples, the plates 114 may have a diameter of between around 100 millimetres and around 150 millimetres. In one example, the plates 114 may have a diameter of around 120 millimetres. Each plate of the plurality of plates 114 may, in some examples, have a thickness of between around 1 millimetre and around 7 millimetres. In other examples, the plates 114 may have a thickness of between around 3 millimetres and around 5 millimetres. In one example, the plates 114 may have a diameter of around 4 millimetres.

The number of plates 114 to be included in the plurality of plates of the apparatus 100 may be determined based on the intended overall size of the filtration apparatus. The greater the number of plates, the greater the amount of liquid carrier 106 that can be filtered at a time. In one example, the filtration apparatus 100 may comprise around 31 plates while, in other examples, more or fewer plates may be included.

Figure 2:
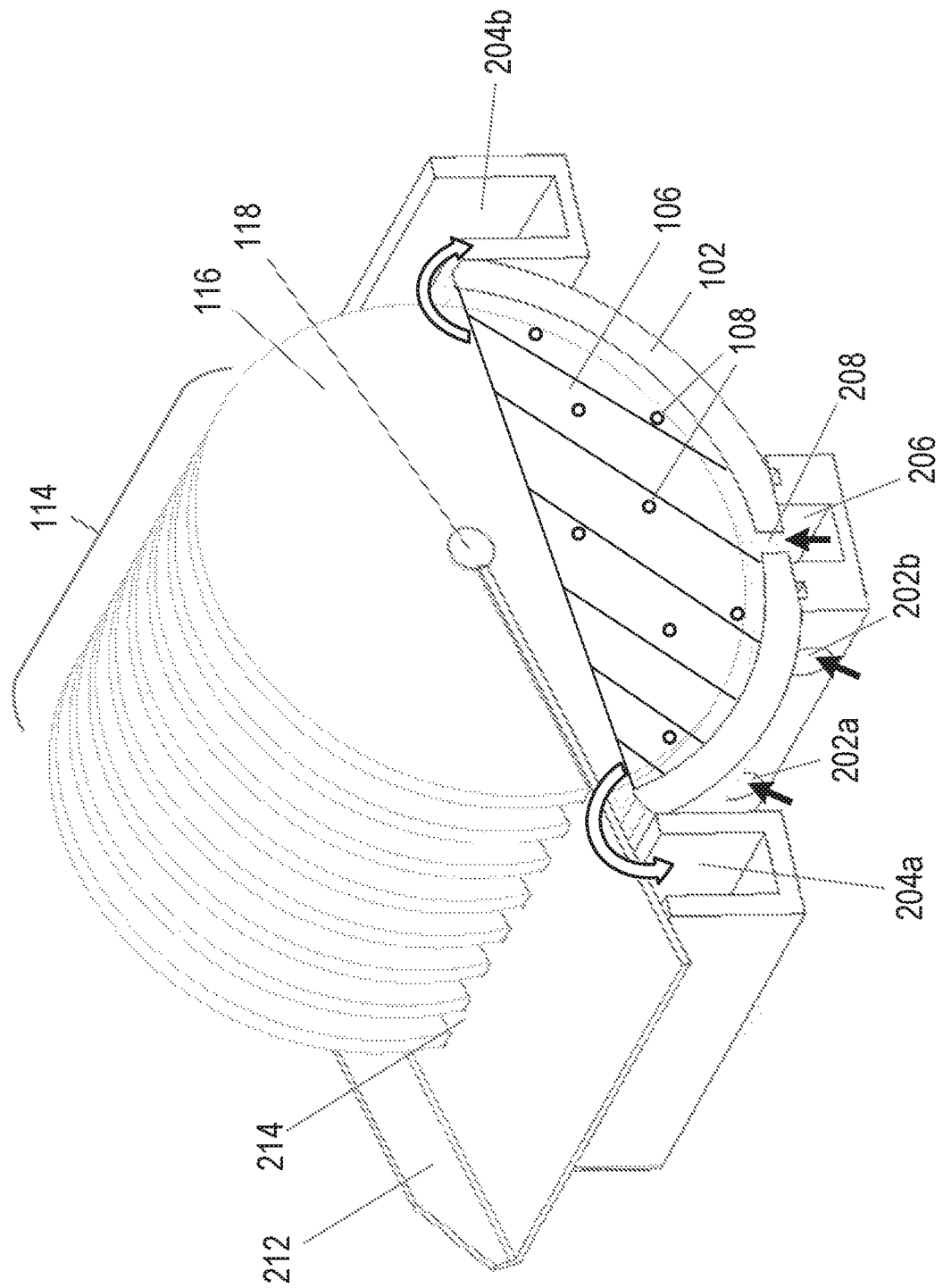
FIG. 2 is a simplified illustration of a further example of a perspective view of a filtration apparatus.
Figure 3:
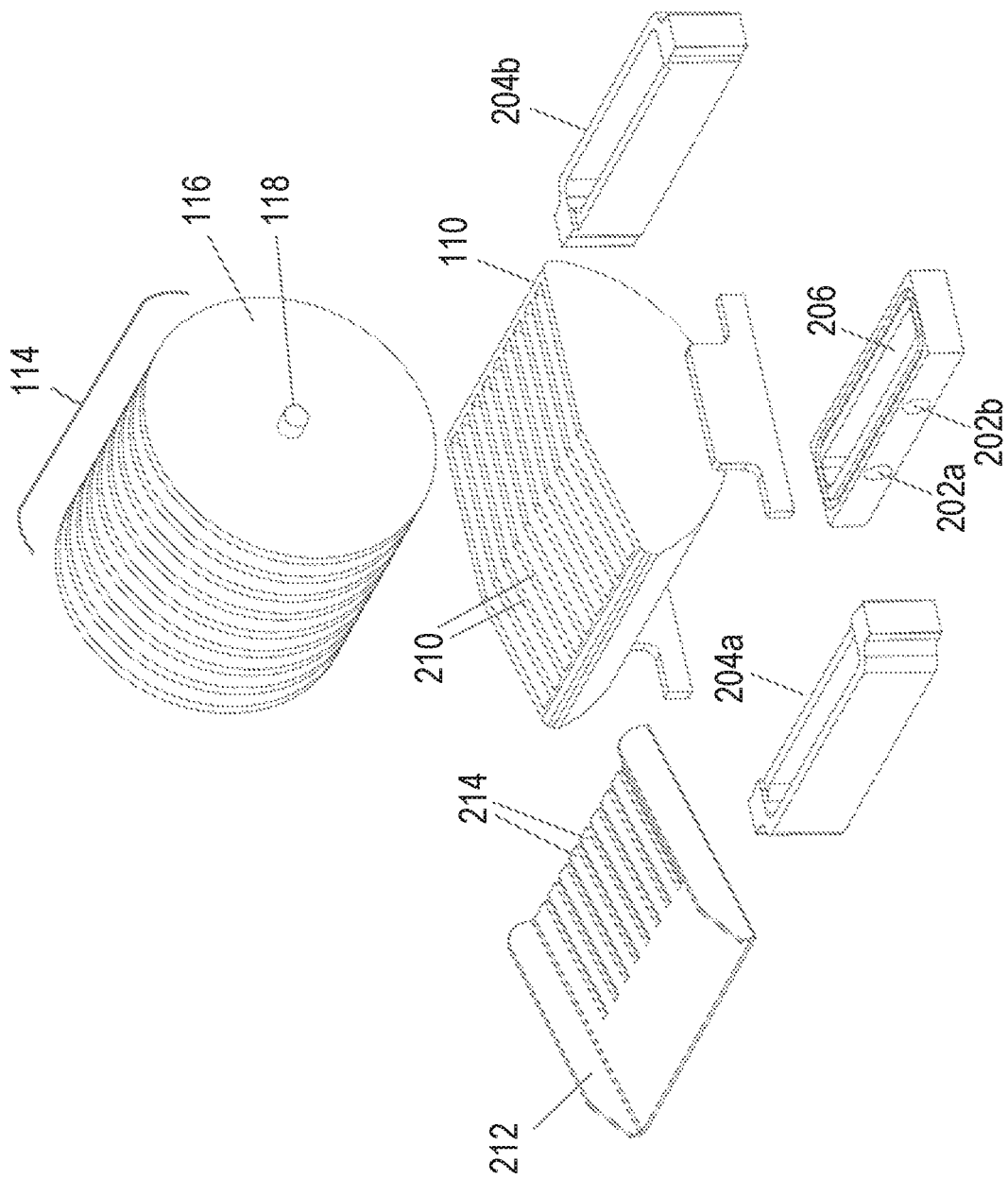
FIG. 3 is a simplified illustration of an exploded view of the print agent filtration apparatus of FIG. 2.

FIGS. 2 and 3 are simplified illustrations of a further example of a filtration apparatus 200. FIG. 2 is a perspective view of part of the filtration apparatus 200, and FIG. 3 is an exploded view of the filtration apparatus 200. In this example, the plurality of plates 114 are formed as a plate assembly, with the plates mounted at their common axis 118, for example on an axis or spindle.

In the example shown in FIGS. 2 and 3, the filtration apparatus 200 includes the electrode 102 having the first surface 104, and the plurality of plates 114, each plate having an accumulation surface 116 on each of its opposing sides. According to the example shown in FIGS. 2 and 3, the filtration apparatus 200 may further comprise inlet 202 to receive the liquid carrier 106 containing non-liquid contaminant into the reservoir 110. The inlet 202 provides a means by which the liquid carrier 106 (e.g. used and/or contaminated liquid carrier) can enter the reservoir 110 to be filtered. The filtration apparatus 200 may further comprise an outlet 204 to allow filtered liquid carrier to flow out of the reservoir 110. In some examples, multiple inlets 202 and/or multiple outlets 204 may be provided.

FIG. 2 shows an example of a particular arrangement of inlets 202 and outlets 204. In some examples, the inlet 202 may comprise multiple apertures 202a, 202b positioned at regular intervals over the extent of the plurality of plates 114 (e.g. at regular intervals over the length of the plate assembly). By spacing the inlet apertures 202a, 202b evenly (i.e. at regular intervals) over the length of the plate assembly (e.g. along the length of the axis 118), an even flow distribution of the liquid carrier 106 among the plates 114 can be achieved. By achieving a uniform flow of the liquid carrier 106 among the plates 114, the filtration of the liquid carrier can be improved, and even optimised. While, in the example shown in FIGS. 2 and 3, two inlets 202a, 202b are provided, in other examples, a greater number of inlets may be provided, and these may be spaced evenly (e.g. positioned at regular intervals) along the length of the axis 118.

In some examples, the inlet 202 (or inlets 202a, 202b) may be positioned below the plurality of plates 114. In this way, liquid carrier 106 entering the filtration apparatus 100, 200 is forced to rise up towards the plates 114, and this may lead to a slower movement of the liquid carrier the plates, thereby reducing the likelihood that liquid carrier will remove (e.g. wash off) non-liquid contaminant that has accumulated to the accumulation surfaces 116 of the plates 114.

In some examples, once liquid carrier 106 has passed into the inlet or inlets 202a, 202b, it may accumulate in an inlet containment region 206, before entering the reservoir 116 through an aperture 208, or multiple apertures, formed through the wall 112 of the reservoir 110. The inlet(s) 202 and/or the aperture(s) 208 may include valves to prevent liquid carrier from leaving the reservoir in this way. In the example shown in FIG. 2, the aperture 208 is formed at the bottom of the reservoir 110, such that liquid carrier 106 is able to rise up from the inlet containment region 206, through the aperture, and into the reservoir. In some examples, multiple apertures 208 may be provided over the length of the reservoir 110. By causing the liquid carrier 106 to accumulate in the inlet containment region 206 before entering the reservoir 110, the flow of the liquid carrier is restricted, so that, once the liquid carrier enters the reservoir, it means mainly upwards to fill the reservoir from below, so as to prevent the flow of liquid carrier from displacing non-liquid contaminant that has adhered to the plates 114.

In some examples, the outlet 204 may comprise multiple outlets 204a, 204b positioned at opposite sides of the reservoir 110. In the example shown in FIG. 2, a first outlet 204a is provided at a first side of the reservoir 110 and a second outlet 204b is provided at a second side of the reservoir. In some examples, the outlet 204 (or outlets 204a, 204b) may comprise an overflow outlet at an edge of the wall 112 of the reservoir 110. The overflow outlets 204a, 204b may comprise trough-like structures, as shown in FIGS. 2 and 3, to receive filtered liquid carrier after it has passed from the inlet 202, through the reservoir 110 (where non-liquid contaminant is removed and becomes adhered to the plates 114) and flowed over the edge of the wall 112 of the reservoir 110. The overflow outlets 204a, 204b may be formed as separate components positioned adjacent to and/or coupled to the reservoir 110, or formed as part of the reservoir. In other examples, the outlet(s) 204 may comprise an aperture or apertures formed at or near to the edge of the reservoir 110, through which filtered liquid carrier may egress the reservoir.

As noted above, the plurality of plates 114 may be rotatable relative to the reservoir 110/electrode 102. In some examples, each of the plurality of plates 114 may be mounted through its centre to a rotatable axis (e.g. the axis 118) such that the plurality of plates are able to rotate about the axis, through the volume of liquid carrier 106. Non-liquid contaminant 108 in the liquid carrier 106 may be attracted to, and may adhere to, the portion of the plates 114 that is submerged in the liquid carrier. As the plates 114 rotate about the axis 118, the portion of the plates to which the non-liquid contaminant 108 is adhered is moved out of the liquid carrier 106 and, therefore, the non-liquid contaminant is removed from the liquid carrier. Consequently, a different portion of each plate is moved into the liquid carrier 106 in the reservoir 110, such that non-liquid contaminant 108 can continue to adhere to the plates.

In some examples, the plurality of plates 114 may be mounted parallel to one another, with substantially equal spacing between each adjacent pair of plates. In some examples, adjacent plates may be separated by around 7 millimetres. Mounting the plates 114 parallel to one another and with equal spacing between adjacent plates helps to achieve a uniform field between the electrode 102 and plates, and therefore causes the adherence of non-liquid contaminant 108 the plates to be substantially uniform throughout the reservoir 110.

In some examples, a separator 210 (see FIG. 3) may be provided between pairs of adjacent plates 114. In the example shown in FIG. 3, the separators 210 form part of the reservoir 110 and/or the electrode 102. Thus, surfaces of the separators 210 also form part of the surface of the electrode 102. Put another way, the electrode surface may, in some examples, extend between pairs of adjacent plates. In this way, the spacing between the surface of the electrode 102 (i.e. formed by the surfaces of the separators 210) may be substantially constant over the portion of the plates 114 submerged in the liquid carrier 106. The separators 210 may extend from the electrode surface 104 to beyond the surface of the liquid carrier 106. By providing the separators 210 in this way (i.e. by extending the electrode surface between the plates), non-liquid contaminant 108 may be caused to adhere more uniformly to the plates, rather than to edge regions of the plates. In examples where separators 210 are provided, the separators and the wall 112 of the reservoir 110 define a plurality of chambers, each chamber to receive a single plate of the plurality of plates 114. Liquid carrier 106 may flow up from the inlet containment region 206, through the aperture or apertures 208 in the reservoir 110, and into each of the chambers. In this way, each plate 114 is to remove non-liquid contaminant 108 from the liquid carrier 106 contained within its corresponding chamber.

According to some examples, the filtration apparatus 200 may further comprise a displacement element 212 to displace non-liquid contaminant 108 from the plurality of plates 114. For example, the displacement element 212 may displace the non-liquid contaminant 108 from the accumulation surfaces 116 of the plates 114. The displacement element 212 may, in some examples, comprise a scraper or blade to scrape or wipe non-liquid contaminant that has accumulated on the accumulation surfaces 116 off the accumulation surfaces. The displacement element 212 may, in some examples, comprise a plurality of fingers 214 to engage the accumulation surfaces 116 of the plates 114. In some examples, each finger 214 may be to engage opposing surfaces of a pair of adjacent plates 114. Thus, the fingers of 214 the displacement element 212 may be sized to fit between adjacent plates 114, such that, as the plates rotate about the axis 118, the fingers scrape and displace the non-liquid contaminant 108 that has adhered to the accumulation surfaces 116, to prevent the adhered contaminant from re-entering the liquid carrier in the reservoir 110.

The filtration apparatus 200 may, in some examples, further comprise a receptacle or bin (not shown) to receive non-liquid contaminant 108 that is displaced from the plates 114 by the displacement element 212. For example, displaced material or contaminant may be caused to fall into such a receptacle from the displacement element 212. The displaced material or contaminant in the receptacle may then be removed, for example for disposal.

The displacement element 212 may, in some examples, be formed from metal. In this way, the displacement element 212 may effectively remove all, or substantially all of the non-liquid contaminant 108 accumulated on the accumulation surfaces 116 of the plates 114. The plates 114 may, in some examples, also be formed from metal and, therefore, a metal displacement element 212 may be used without the risk of damaging the plates. In some examples, the plates 114 may have a ceramic coating to further strengthen the plates and reduce damage caused by the displacement element. Thus, effective displacement of non-liquid contaminant 108 from the plates 114 can be achieved while ensuring that wear or damage to the plates is prevented or kept to a minimum.

The rate of rotation of the plates 114 (e.g. about the axis 118) may be chosen to provide a suitable duration within the liquid carrier 106, such that the non-liquid contaminant 108 has sufficient time to move towards, and adhere to, the accumulation surfaces 116 of the plates. In some examples, the plates 114 may rotate at a rate of between around 0.2 revolutions per minute and around 0.5 revolutions per minute. In some examples, the plates 114 may rotate at a rate of around 0.25 revolutions per minute.

Figure 4:
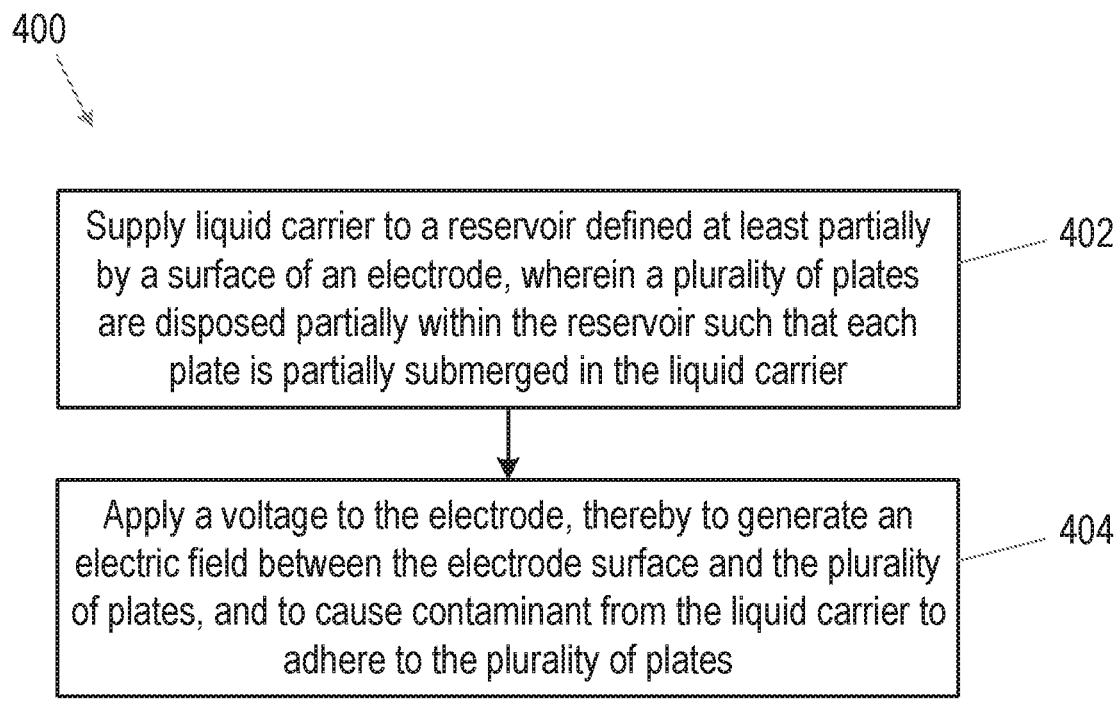
FIG. 4 is a flowchart of an example of a filtration method.

Another aspect of the disclosure relates to a filtration method, for example a method for filtering print agent. FIG. 4 is a flowchart of an example of a filtration method 400. The method 400 may be to remove contaminant (e.g. non-liquid material and/or particles) 108 from liquid carrier, such as the liquid carrier 106. The method 400 comprises, at block 402, supplying liquid carrier 106 to a reservoir 110 defined at least partially by a surface of an electrode 102, wherein a plurality of plates 114 are disposed partially within the reservoir such that each plate is partially submerged in the liquid carrier. At block 404, the method 400 further comprises applying a voltage to the electrode 102, thereby to generate an electric field between the electrode surface and the plurality of plates 114, and to cause contaminant 108 from the liquid carrier 106 to adhere to the plurality of plates.

The flow rate of the liquid carrier 106 (i.e. the rate at which the liquid carrier is supplied into the reservoir 110, for example via the inlet 202) may be selected based on the intended adherence of contaminant to the plates 114. In some examples, the liquid carrier 106 may be supplied into the reservoir 110 at a rate of between around 15 litres per minute and around 25 litres per minute. In other examples, the liquid carrier 106 may be supplied into the reservoir 110 at a rate of between around 19 litres per minute and around 21 litres per minute. In one example, the liquid carrier 106 may be supplied into the reservoir 110 at a rate of around 20 litres per minute. As noted above, if the flow rate is too high, then liquid carrier 106 flowing into the reservoir 110 may cause contaminant that has accumulated on and adhered to the plates 114 to be displaced from (e.g. washed away from) the plates prematurely (i.e. while the non-liquid contaminant is still submerged in the liquid carrier 106). Therefore, the flow rate of the liquid carrier 106 is chosen to be low enough that contaminant is not displaced from the plates 114, but high enough that liquid carrier can be filtered (i.e. contaminant can be removed from the liquid carrier) at an intended rate.

Figure 5:
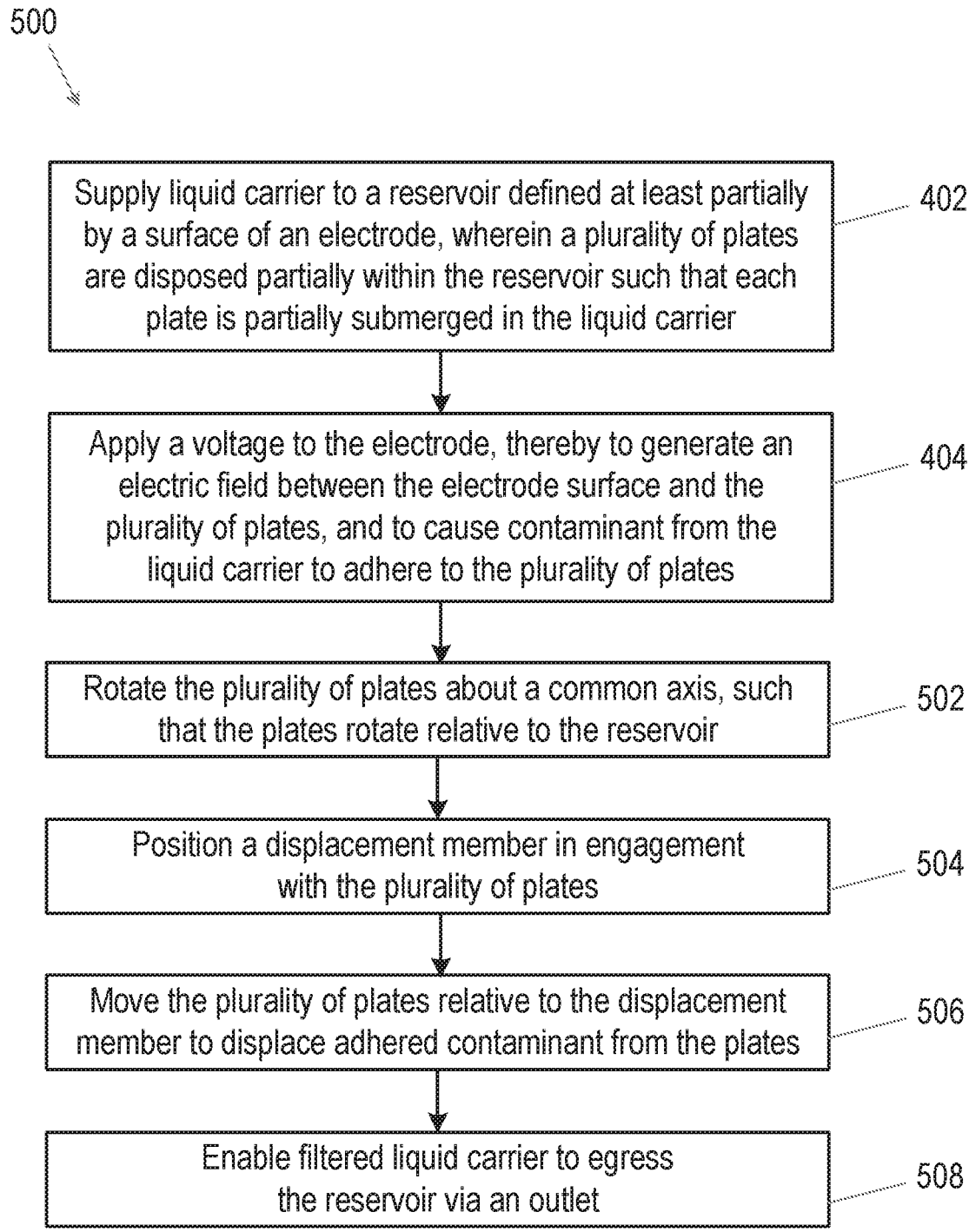
FIG. 5 is a flowchart of a further example of a filtration method.

FIG. 5 is a flowchart of a further example of a filtration method 500. The method 500 may comprise a block or blocks of the method 400 described above. The method 500 may further comprise, at block 502, rotating the plurality of plates 114 about a common axis, such that the plates rotate relative to the reservoir. The plates 114 may, for example, be rotated about the axis 118.

At block 504, the method 500 may, in some examples, further comprise positioning a displacement member, such as the displacement member 212, in engagement with the plurality of plates 114. The method 500 may further comprise, at block 506, moving the plurality of plates 114 relative to the displacement member 212 to displace adhered contaminant 108 from the plates. In some examples, the method 500 may further comprise collecting the displaced contaminant, for example in a receptacle. As noted above, moving the plurality of plates 114 may comprise rotating the plates relative to the displacement member 212.

The method 500 may, further comprise, at block 508, enabling filtered liquid carrier to egress the reservoir 110 via an outlet 204. In some examples, enabling the filtered liquid carrier to egress the reservoir 110 may comprise enabling the filtered liquid carrier to flow over an edge of the reservoir. Filtered liquid carrier that has egressed the reservoir may be retrieved (e.g. collected in a collection reservoir or container) for reuse or recycling.

Figure 6:
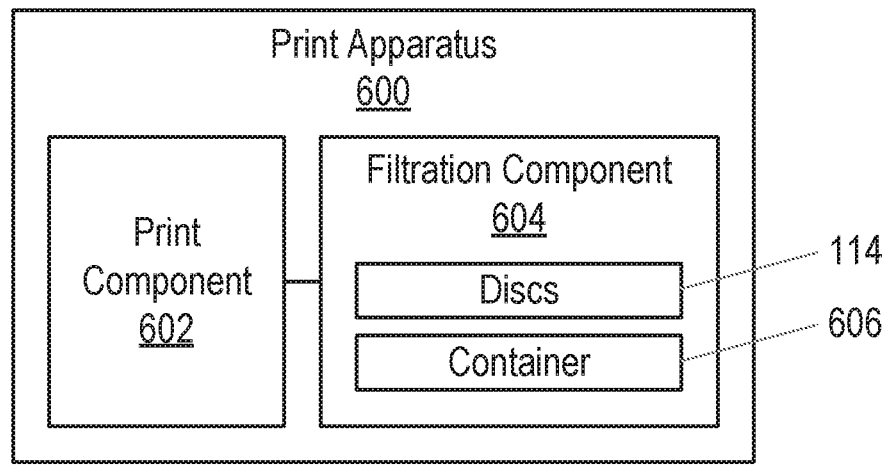
FIG. 6 is a simplified schematic of an example of a print apparatus.

According to another aspect, the disclosure relates to a print apparatus. FIG. 6 is a simplified schematic of an example of a print apparatus 600. The print apparatus 600 may, for example, comprise a printer, such as a liquid electrophotography printer. The print apparatus 600 comprises a print component 602 to print onto a printable substrate during a printing operation. The print component 602 may, for example, comprise various components or subcomponents, such as a print head. The print apparatus 600 further comprises a filtration component 604 to remove non-liquid contaminant 108 from liquid carrier 106 used in the printing operation. The filtration component 604 comprises a container 606 to house a volume of liquid carrier, the container having a wall forming an electrode 102. The container 606 may, in some examples, comprise or be similar to the reservoir 110. The filtration component 604 further comprises a plurality of discs 114, each disc having a contaminant receiving surface 116, wherein each disc is partially disposed within the container 606, such that each disc is partially submerged in the volume of liquid carrier 106. When a voltage is applied to the electrode 102, an electric field is formed between the electrode and the plurality of discs 114, thereby causing non-liquid contaminant 108 in the liquid carrier 106 to adhere to the contaminant receiving surfaces 116. Thus, the filtration component 604 may comprise or form part of the filtration apparatus 100, 200 discussed above.

Figure 7:
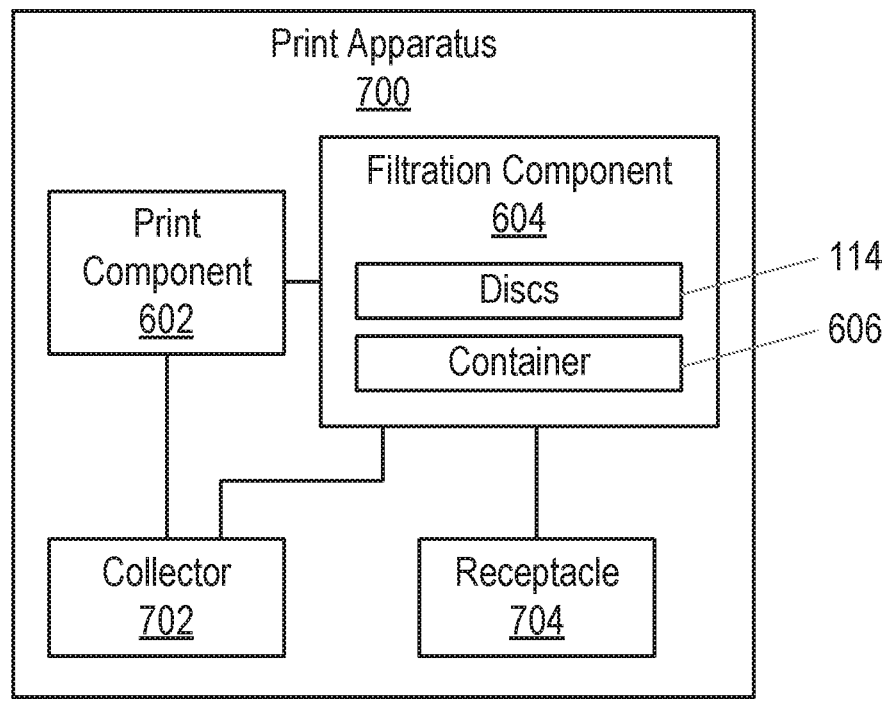
FIG. 7 is a simplified schematic of a further example of a print apparatus.

FIG. 7 is a simplified schematic of a further example of a print apparatus 700. The print apparatus 700 may comprise a component or components of the print apparatus 600 discussed above. In some examples, the filtration component may further comprise a contaminant displacement member 212 to displace non-liquid contaminant 108 from the plurality of plates 114. The displacement member 212 may, for example, comprise a scraper or blade, and may, in some examples have a finger-like arrangement. The print apparatus 700 may further comprise a collector 702 to receive filtered liquid carrier from the flow region. As noted above, the filtered liquid carrier (i.e. the liquid carrier with the non-liquid contaminant having been removed) may, in some examples, be extracted and reused or recycled.

The print apparatus 700 may, in some examples, further comprise a receptacle 704 to receive non-liquid contaminant 108 displaced from the plurality of plates 114. The receptacle 704 (e.g. a bin) may collect the non-liquid contaminant 108 that has been removed from the plates 114 ready for disposal.

The filtration component 604 of the print apparatus 600, 700 may, in some examples, operate continuously during operation of the print apparatus. In other examples, the filtration component 604 may be operated intermittently, for example at intervals. In such examples, liquid carrier 106 may be stored in a storage region, for example, until the filtration component 604 is in operation. The liquid carrier 106 may then be fed into the filtration component 604 (e.g. into the reservoir 110) according to the methods described above, to be filtered.

In some examples, a self-cleaning operation may be performed on the filtration apparatus 100, 200 or the filtration component 604 of the print apparatus 600, 700. For example, at the end of a printing operation, the plates 114 of the filtration apparatus 100, 200 or the filtration component 604 may be rotated (e.g. by rotating the axis 118) without an electric field being applied by the electrode 102. In this way, debris (non-liquid contaminant 108) does not develop/accumulate on the accumulation surfaces 116 of the plates 114, and the displacement element 212 can be used to scrape any remaining contaminant from the plates. The plates 114 can therefore be thoroughly cleaned, ready for the next printing operation. Maintaining the plates in a clean manner can help to improve the life of the plates and of the apparatus 100, 200.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be able to design many alternative implementations without departing from the scope of the appended claims. Features described in relation to one example may be combined with features of another example.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A filtration apparatus to remove non-liquid contaminant from liquid carrier, the filtration apparatus comprising:
an electrode having a first surface, wherein the electrode is to generate an electric field towards liquid carrier containing non-liquid contaminant;
a reservoir having an exterior wall defined at least partially by the first surface, the reservoir to house a volume of liquid carrier;
a plurality of plates, each plate having an accumulation surface, wherein a portion of each plate is within the reservoir, so as to be submerged in the volume of liquid carrier; and
a plurality of separators extending from exterior wall of the reservoir that corresponds to the first surface of the electrode, the plurality of separators to assist in generating the electric field, each of the plurality of separators being disposed between a respective pair of the plurality of plates, wherein the electric field is formed between the first surface and the accumulation surface of each plate of the plurality of plates and is to act on the liquid carrier, to thereby cause non-liquid contaminant to adhere to the accumulation surface of each plate of the plurality of plates.

2. A filtration apparatus according to claim 1, further comprising:
an inlet to receive the liquid carrier containing non-liquid contaminant into the reservoir; and
an outlet to allow filtered liquid carrier to flow out of the reservoir.

3. A filtration apparatus according to claim 2, wherein the inlet is positioned below the plurality of plates.

4. A filtration apparatus according to claim 2, wherein the outlet comprises an overflow outlet at an edge of the exterior wall of the reservoir.

5. A filtration apparatus according to claim 1, wherein the plurality of plates are electrically grounded.

6. A filtration apparatus according to claim 1, wherein each of the plurality of plates is mounted through its centre to a rotatable axis, such that the plurality of plates are able to rotate about the rotatable axis, through the volume of liquid carrier.

7. A filtration apparatus according to claim 6, wherein the plurality of plates are mounted parallel to one another, with substantially equal spacing between each adjacent pair of plates.

8. A filtration apparatus according to claim 1, further comprising:
a displacement element to displace non-liquid contaminant from the plurality of plates.

9. A filtration apparatus according to claim 8, wherein the displacement element comprises a plurality of fingers, each finger to engage opposing surfaces of a pair of adjacent plates.

10. A print apparatus comprising:
a print component to print onto a printable substrate during a printing operation; and
a filtration component to remove non-liquid contaminant from a liquid carrier used in the printing operation, the filtration component comprising:
a container to house a volume of liquid carrier, the container having a wall forming an electrode; and
a plurality of discs, each disc having a contaminant receiving surface, wherein each disc is partially disposed within the container, such that each disc is partially submerged in the volume of liquid carrier; and
a plurality of separators extending from the wall of the container forming the electrode, wherein, when a voltage is applied to the electrode, an electric field is formed between the electrode and the plurality of discs, thereby causing non-liquid contaminant in the liquid carrier to adhere to the contaminant receiving surfaces and wherein the plurality of separators extending from the electrode assist in generating the electric field, each of the plurality of separators being disposed between a respective pair of the plurality of discs.

11. A print apparatus according to claim 10, wherein the filtration component further comprises a contaminant displacement member to displace non-liquid contaminant from the plurality of discs; and wherein the print apparatus further comprises:
- a collector to receive filtered liquid carrier from the container; and
- a receptacle to receive non-liquid contaminant displaced from the plurality of discs.

\* \* \* \* \*